(12) United States Patent
Shen et al.

(10) Patent No.: US 12,249,322 B1
(45) Date of Patent: Mar. 11, 2025

(54) INTENT RECOGNITION METHOD, APPARATUS AND STORAGE MEDIUM

(71) Applicant: Beijing Waterdrop Technology Group Co., Ltd., Beijing (CN)

(72) Inventors: Peng Shen, Beijing (CN); Lizhao Guo, Beijing (CN); Fupo Wang, Beijing (CN); Mingxing Huang, Beijing (CN); Xiaobo Zhou, Beijing (CN)

(73) Assignee: Beijing Waterdrop Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/927,212

(22) Filed: Oct. 25, 2024

(51) Int. Cl.
| | | |
|---|---|---|
| *G10L 15/18* | (2013.01) | |
| *G10L 15/02* | (2006.01) | |
| *G10L 15/197* | (2013.01) | |
| *G10L 25/18* | (2013.01) | |
| *G10L 25/21* | (2013.01) | |
| *G10L 25/45* | (2013.01) | |

(52) U.S. Cl.
CPC .......... *G10L 15/1815* (2013.01); *G10L 15/02* (2013.01); *G10L 15/197* (2013.01); *G10L 25/18* (2013.01); *G10L 25/21* (2013.01); *G10L 25/45* (2013.01)

(58) Field of Classification Search
CPC ... G10L 15/1815; G10L 15/02; G10L 15/197; G10L 25/18; G10L 25/21; G10L 25/45
USPC ......................................................... 704/240
See application file for complete search history.

(56) References Cited

U.S. PATENT DOCUMENTS

| | | | | |
|---|---|---|---|---|
| 5,513,305 | A  * | 4/1996 | Maghbouleh | G06F 8/33 |
| | | | | 715/781 |
| 9,081,761 | B1 * | 7/2015 | Little | G06F 40/232 |
| 9,411,860 | B2 * | 8/2016 | Castellanos | G06Q 30/02 |
| 9,800,727 | B1 * | 10/2017 | Chakrabarty | H04L 67/02 |
| 10,630,840 | B1 * | 4/2020 | Karp | H04M 3/5235 |
| 11,568,145 | B1 * | 1/2023 | Romeo | G06F 40/30 |
| 11,580,968 | B1 * | 2/2023 | Gupta | G10L 15/22 |
| 11,967,033 | B1 * | 4/2024 | Pisoni | G06V 30/19173 |
| 12,045,568 | B1 * | 7/2024 | Shrivastava | G10L 15/30 |
| 12,125,478 | B2 * | 10/2024 | Zhou | G10L 15/16 |
| 2006/0020559 | A1 * | 1/2006 | Steinmetz | G07C 9/21 |
| | | | | 705/67 |

(Continued)

FOREIGN PATENT DOCUMENTS

| | | |
|---|---|---|
| CN | 107516511 A | 12/2017 |
| CN | 112669821 A | 4/2021 |
| CN | 116052646 A | 5/2023 |

*Primary Examiner* — Thuykhanh Le
(74) *Attorney, Agent, or Firm* — George D. Morgan

(57) ABSTRACT

An intent recognition method, an intent recognition apparatus, a storage medium and a computer device are provided, aiming to improve the accuracy and the efficiency of the intent recognition, which relates to the technical field of information. The method includes: acquiring user's audio to be recognized; determining multi-frame audio feature vectors corresponding to the audio to be recognized; inputting the multi-frame audio feature vectors into a preset intent recognition model to obtain multiple output sequences corresponding to the multi-frame audio feature vectors, wherein the output sequences comprise blank characters and non-blank characters; and determining a target intent corresponding to the audio to be recognized based on the multiple output sequences. The present disclosure is suitable for recognizing the intent of the user.

6 Claims, 5 Drawing Sheets

(56) References Cited

U.S. PATENT DOCUMENTS

| | | | | |
|---|---|---|---|---|
| 2014/0222436 | A1* | 8/2014 | Binder | G06F 3/167 |
| | | | | 704/275 |
| 2017/0357661 | A1* | 12/2017 | Hornkvist | G06F 16/148 |
| 2019/0295542 | A1* | 9/2019 | Huang | G06F 3/167 |
| 2019/0303442 | A1* | 10/2019 | Peitz | G10L 15/1822 |
| 2019/0348041 | A1* | 11/2019 | Cella | G10L 15/30 |
| 2020/0043480 | A1* | 2/2020 | Shen | G06F 40/30 |
| 2020/0311070 | A1* | 10/2020 | Yan | G06N 20/00 |
| 2020/0311199 | A1* | 10/2020 | Yan | G06F 16/367 |
| 2020/0312300 | A1* | 10/2020 | Yan | G10L 15/063 |
| 2020/0395016 | A1* | 12/2020 | Kapila | G10L 15/22 |
| 2021/0004441 | A1* | 1/2021 | Sapugay | G06N 5/01 |
| 2021/0004537 | A1* | 1/2021 | Sapugay | G06F 16/686 |
| 2021/0241762 | A1* | 8/2021 | Jang | G10L 15/22 |
| 2021/0249002 | A1* | 8/2021 | Ahmadidaneshashtiani | |
| | | | | G06F 40/284 |
| 2021/0352560 | A1* | 11/2021 | Cai | H04L 65/1083 |
| 2022/0059085 | A1* | 2/2022 | Thomas | G10L 15/22 |
| 2022/0293095 | A1* | 9/2022 | Kim | G10L 15/1815 |
| 2023/0169127 | A1* | 6/2023 | Barbedor | G06Q 10/109 |
| | | | | 715/764 |
| 2023/0353674 | A1* | 11/2023 | Karp | H04M 3/5235 |
| 2023/0359765 | A1* | 11/2023 | Selvaraju | G06F 21/6245 |
| 2023/0385557 | A1* | 11/2023 | Sabapathy | G06F 16/345 |
| 2024/0038222 | A1* | 2/2024 | Chaar | G06Q 10/1095 |
| 2024/0087592 | A1* | 3/2024 | Mou | G10L 15/02 |
| 2024/0095460 | A1* | 3/2024 | Xu | G06F 40/30 |
| 2024/0331685 | A1* | 10/2024 | Seagraves | G10L 15/16 |
| 2024/0379097 | A1* | 11/2024 | Lee | G10L 15/22 |
| 2024/0386883 | A1* | 11/2024 | Darla | G06F 40/216 |

* cited by examiner

INTENT RECOGNITION METHOD, APPARATUS AND STORAGE MEDIUM

CROSS-REFERENCE TO RELATED APPLICATIONS

The application claims priority to Chinese patent application No. 202311481664.X, filed on Nov. 9, 2023, the entire contents of which are incorporated herein by reference.

TECHNICAL FIELD

The present disclosure relates to the technical field of information, and in particular to an intent recognition method, an intent recognition apparatus, and a computer readable storage medium.

BACKGROUND

With the continuous development of society, there is an increasing demand for Artificial Intelligence (AI), and one of the most widely used applications is human-machine dialogue scenarios. In order to improve the accuracy of human-machine dialogue, it becomes especially important to accurately recognize the speaker's intention.

Currently, the speaking content of a client is generally recognized first in an intent recognition process. Then the speaking content is transcribed into a corresponding text, and then the intent of a speaker is recognized in the corresponding text. However, the quality of recognizing the speaker's intention is directly affected by the accuracy of converting the voice into the text in this intent recognition process. For example, the accuracy of intent recognition will also be lowered if the accuracy of text conversion is low due to the background noise or the speaker's accent. Furthermore, text conversion will take some time and may lead to low efficient in intent recognition.

SUMMARY

In view of this, an intent recognition method, an intent recognition apparatus, a storage medium and a computer device are provided, aiming to improve the accuracy and the efficiency of the intent recognition.

According to a first aspect of the present disclosure, an intent recognition method is provided. The method includes:
acquiring user's audio to be recognized;
determining multi-frame audio feature vectors corresponding to the audio to be recognized;
inputting the multi-frame audio feature vectors into a preset intent recognition model to obtain multiple output sequences corresponding to the multi-frame audio feature vectors, wherein the output sequences include blank characters and non-blank characters; and
determining a target intent corresponding to the audio to be recognized based on the multiple output sequences.

Optionally, before the acquiring user's audio to be recognized, the method further includes:
formulating a preset initial intent recognition model and acquiring a sample audio and an actual output sequence corresponding to the sample audio;
determining multi-frame sample audio feature vectors corresponding to the sample audio;
inputting the multi-frame sample audio feature vectors into the preset initial intent recognition model to obtain a predicted output sequence corresponding to the multi-frame sample audio feature vectors;
formulating a loss function corresponding to the preset initial intent recognition model based on the predicted output sequence and the actual output sequence; and
formulating the preset intent recognition model based on the loss function.

Optionally, the determining multi-frame audio feature vectors corresponding to the audio to be recognized includes:
cutting the audio to be recognized in a preset length threshold unit to obtain a plurality of short-time frame audios;
windowing the short-time frame audios by using a preset Hamming Window function to obtain a plurality of windowed audios corresponding to the short-time frame audios respectively;
performing first-order high-pass filtering on the plurality of windowed audios to obtain a plurality of high-frequency short-time frame audios;
performing transformation on the plurality of high-frequency short-time frame audios by utilizing a preset Fourier transform function respectively to obtain a plurality of processed high-frequency short-time frame audios;
determining power spectrums corresponding to the processed high-frequency short-time frame audios respectively;
performing convolution operation between the power spectrums and a preset triangular filtering function group to obtain a result filtered by triangular filtering functions in the preset triangular filtering function group;
performing logarithmic operation on the result filtered by the triangular filtering functions to obtain high-dimensional audio features corresponding to the plurality of short-time frame audios respectively; and
performing discrete cosine transform on the high-dimensional audio features corresponding to the plurality of short-time frame audios respectively to obtain the multi-frame audio feature vectors corresponding to the audio to be recognized.

Optionally, the inputting the multi-frame audio feature vectors into a preset intent recognition model to obtain multiple output sequences corresponding to the multi-frame audio feature vectors includes:
inputting the multi-frame audio feature vectors into the preset intent recognition model to obtain multiple output characters corresponding to the multi-frame audio feature vectors respectively; and
splicing an arbitrary output character corresponding to the multi-frame audio feature vectors sequentially to obtain one of the output sequences corresponding to the multi-frame audio feature vectors.

Optionally, the determining a target intent corresponding to the audio to be recognized based on the multiple output sequences includes:
calculating probability values corresponding to the multiple output sequences respectively; and
determining a maximum probability value in the probability values and then determining the target intent corresponding to the audio to be recognized based on the output sequence corresponding to the maximum probability value.

Optionally, the calculating probability values corresponding to the multiple output sequences respectively includes:

removing the blank characters of an arbitrary output sequence in the multiple output sequences to obtain a processed output sequence;

merging the duplicate non-blank characters in the processed output sequence to obtain a simplified output sequence;

tokenizing the simplified output sequence to obtain multiple tokens corresponding to the arbitrary output sequence;

determining token frequencies of the tokens in the arbitrary output sequence; and multiplying the token frequencies corresponding to the tokens to obtain a probability value corresponding to the arbitrary output sequence.

The determining the target intent corresponding to the audio to be recognized based on the output sequence corresponding to the maximum probability value includes:

combining the tokens of the output sequence corresponding to the maximum probability value in sequence to obtain the target intent corresponding to the audio to be recognized.

Optionally, the determining token frequencies of the tokens in the arbitrary output sequence includes:

determining total character count of the characters corresponding to the arbitrary output sequence, wherein the characters include blank characters and non-blank characters;

determining quantity of the blank characters that are adjacent in forward order to an arbitrary token in the tokens, and determining quantity of the duplicate characters that are the same as the arbitrary token;

dividing the quantity of the blank characters by the total quantity of the characters to obtain a blank token frequency corresponding to the arbitrary token;

dividing a sum of the quantity of the duplicate character and 1 by the total quantity of the characters to obtain a duplicate token frequency corresponding to the arbitrary token; and multiplying the blank token frequency by the duplicate token frequency to obtain the token frequency of the arbitrary token in the arbitrary output sequence.

According to a second aspect of the present disclosure, an intent recognition apparatus is provided. The apparatus includes an acquiring unit, a first determining unit, a recognition unit and a second determining unit.

The acquiring unit is configured to acquire user's audio to be recognized.

The first determining unit is configured to determine multi-frame audio feature vectors corresponding to the audio to be recognized.

The recognition unit is configured to input the multi-frame audio feature vectors into a preset intent recognition model to obtain multiple output sequences corresponding to the multi-frame audio feature vectors, wherein the output sequences include blank characters and non-blank characters.

The second determining unit is configured to determine a target intent corresponding to the audio to be recognized based on the multiple output sequences.

According to a third aspect of the present disclosure, a computer readable storage medium is provided. The computer readable storage medium stores a computer program. The computer program, when executed by a processor, performs the above intent recognition method.

According to a fourth aspect of the present disclosure, a computer device is provided. The computer device includes: a memory; a processor; and a computer program that is stored in the memory and executable by the processor. The computer program, when executed by the processor, performs the above intent recognition method.

An intent recognition method, an intent recognition apparatus, a storage medium and a computer device are provided according to the present disclosure. In the present disclosure, the user's audio to be recognized is acquired, in comparison with the present mode that the speaking content of a client is generally recognized, the speaking content is transcribed into a corresponding text, and then the intent of a speaker is recognized in the transcribed text. The multi-frame audio feature vectors corresponding to the audio to be recognized are determined. The multi-frame audio feature vectors are input into a preset intent recognition model to obtain multiple output sequences corresponding to the multi-frame audio feature vectors, wherein the output sequences include blank characters and non-blank characters. The target intent corresponding to the audio to be recognized is determined based on the multiple output sequences. Therefore, the final intent recognition result is obtained by directly extracting the audio features of the audio to be recognized and directly inputting the audio features into the model. By directly utilizing the model to recognize the audio features, conversion errors and time wasted in conversion caused by converting audio to text can be avoided, so that the present disclosure is able to improve the accuracy and the efficiency of the intent recognition.

BRIEF DESCRIPTION OF DRAWINGS

The drawings described herein are intended to provide a further understanding of the present disclosure and constitute a part of the present disclosure. The illustrative embodiments of the present disclosure and the description thereof are intended to explain the present disclosure, and do not constitute an undue limitation to the present disclosure. In the accompanying drawings.

DETAILED DESCRIPTION OF THE EMBODIMENTS

The present disclosure is described in detail below with reference to the accompanying drawings and in conjunction with the embodiments. It should be noted that the embodiments of the present disclosure and features in the embodiments may be combined with each other without conflict.

Currently, the speaking content of a client is generally recognized first. Secondly, the speaking content is transcribed into a corresponding text, and then the intent of a speaker is recognized in the transcribed text. If the accuracy of text conversion is low due to background noise or speaker's accent, the accuracy of intent recognition will also be lowered. At the same time, text conversion takes some time and may lead to less efficient intent recognition.

Figure 1:
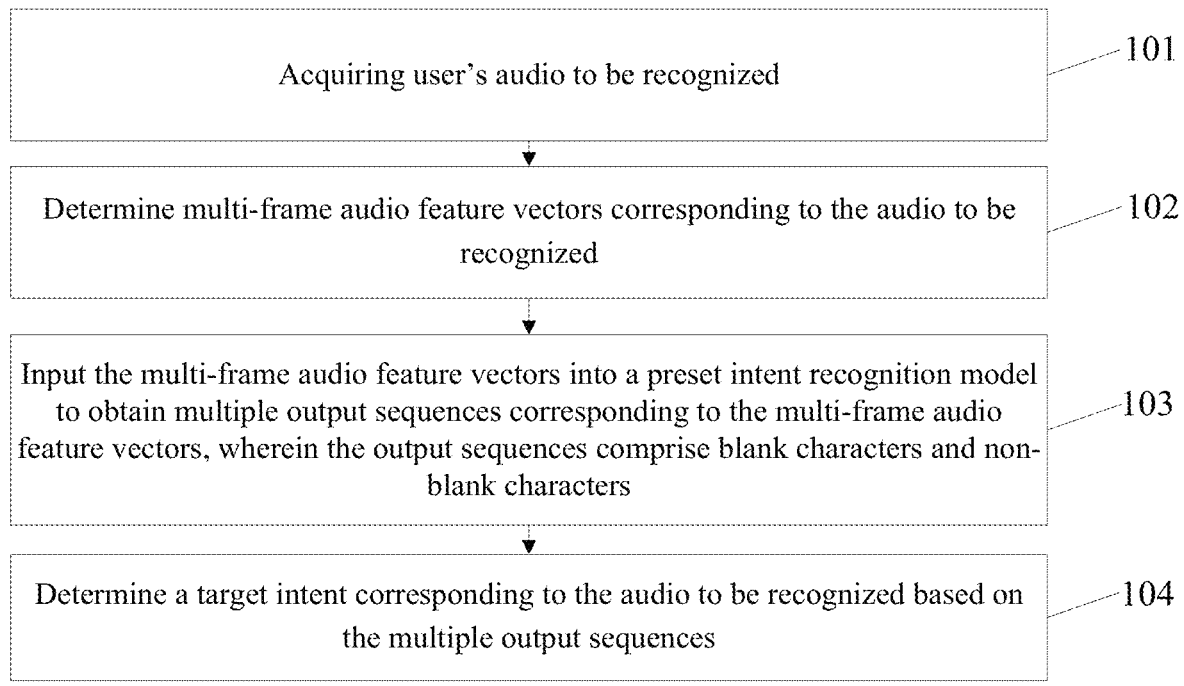
FIG. 1 is a flowchart illustrating an intent recognition method according to an embodiment of the present disclosure.

To solve the above problem, an intent recognition method is provided according to an embodiment of the present disclosure. As shown in FIG. 1, the method includes steps 101 to 104.

In 101, the user's audio to be recognized is acquired.

The audio to be recognized may be an audio for communicating with the AI customer service. According to the embodiment of the present disclosure, the audio of the user can be acquired in real time in the process of the communication between the user and the AI customer service. An intent analysis is carried out on the audio of the user to obtain the intent of the user. A satisfactory answer is replied to the user according to the intent of the user, so that the answering efficiency and the answering accuracy for the user can be improved, and the user experience is improved.

In 102, multi-frame audio feature vectors corresponding to the audio to be recognized are determined.

Specifically, to improve the accuracy of intent recognition, it is further required to determine the audio feature vectors corresponding to the audio to be recognized after the audio to be recognized of the user is acquired. The audio feature vectors are features of all frames of the audio. For example, for a 2 s audio with a frame shift of 10 ms, there are 20 frames, i.e., there are 20 frames of audio feature vectors in total. The multi-frame audio feature vectors are then input into a preset intent recognition model to obtain multiple output sequences corresponding to the multi-frame audio feature vectors. So that by directly determining the feature of the voice of the user and analyzing the voice feature by using the model, the efficiency and the accuracy of the intent recognition can be improved.

In 103, the multi-frame audio feature vectors are input into a preset intent recognition model to obtain multiple output sequences corresponding to the multi-frame audio feature vectors, wherein the output sequences include blank characters and non-blank characters.

The preset intent recognition model may be a pre-trained neural network model. In the embodiment of the present disclosure, after the multi-frame audio feature vectors of the audio to be recognized are acquired, the multi-frame audio feature vectors are directly input into the preset intent recognition model. The multi-frame audio feature vectors are sequentially input into the preset intent recognition model. Each frame of audio is input into the preset intent recognition model and has a plurality of corresponding output results. Take the three-frame audio feature vectors as an example, the first frame audio feature vector is input into the preset intent recognition model. With the preset intent recognition model, a plurality of output results corresponding to the first frame audio feature vector can be output. The second frame audio feature vector is input into the preset intent recognition model. With the preset intent recognition model, a plurality of output results (e.g., two results) corresponding to the second frame audio feature vector can be output. The third frame audio feature vector is input into a preset intent recognition model. With the preset intent recognition model, a plurality of output results corresponding to the third frame audio feature vector can be output. The output result corresponding to each frame audio feature vector may include a blank result. At this time, a blank character "-" may be used for substitution. And then any one of the output results corresponding to the three-frame audio feature vectors is sequentially combined to obtain multiple output sequences. For example, if a certain output result corresponding to the first frame audio feature vector is "-", a certain output result corresponding to the second frame audio feature vector is "school", and a certain output result corresponding to the third frame audio feature vector is "student", the output sequence after final combining is: the "- school student". Because each frame of audio feature vector corresponds to a plurality of output results, multiple output sequences will be obtained. Finally, the target intent corresponding to the audio to be recognized is determined based on the multiple output sequences, which can improve the efficiency and the accuracy of the intent recognition.

In 104, a target intent corresponding to the audio to be recognized based on the multiple output sequences is determined.

In the embodiment of the present disclosure, after the multiple output sequences are output from the preset intent recognition model, the optimal output sequence is determined among the multiple output sequences. The target intent corresponding to the audio to be recognized is determined according to the optimal output sequence. Therefore, the final intent recognition result is obtained by directly extracting the audio features of the audio to be recognized and directly inputting the audio features into the model. By directly utilizing the model to recognize the audio features, conversion errors and time wasted in conversion caused by converting audio to text can be avoided, so that the present disclosure is able to improve the accuracy and the efficiency of the intent recognition.

An intent recognition is provided according to the present disclosure. In the present disclosure, the user's audio to be recognized is acquired, in comparison with the present mode that the speaking content of a client is generally recognized, the speaking content is transcribed into a corresponding text, and then the intent of a speaker is recognized in the transcribed text. The multi-frame audio feature vectors corresponding to the audio to be recognized are determined. The multi-frame audio feature vectors are input into a preset intent recognition model to obtain multiple output sequences corresponding to the multi-frame audio feature vectors, wherein the output sequences include blank characters and non-blank characters. The target intent corresponding to the audio to be recognized is determined based on the multiple output sequences. Therefore, the final intent recognition result is obtained by directly extracting the audio features of the audio to be recognized and directly inputting the audio features into the model. By directly utilizing the model to recognize the audio features, conversion errors and time wasted in conversion caused by converting audio to text can be avoided, so that the present disclosure is able to improve the accuracy and the efficiency of the intent recognition.

Figure 2:
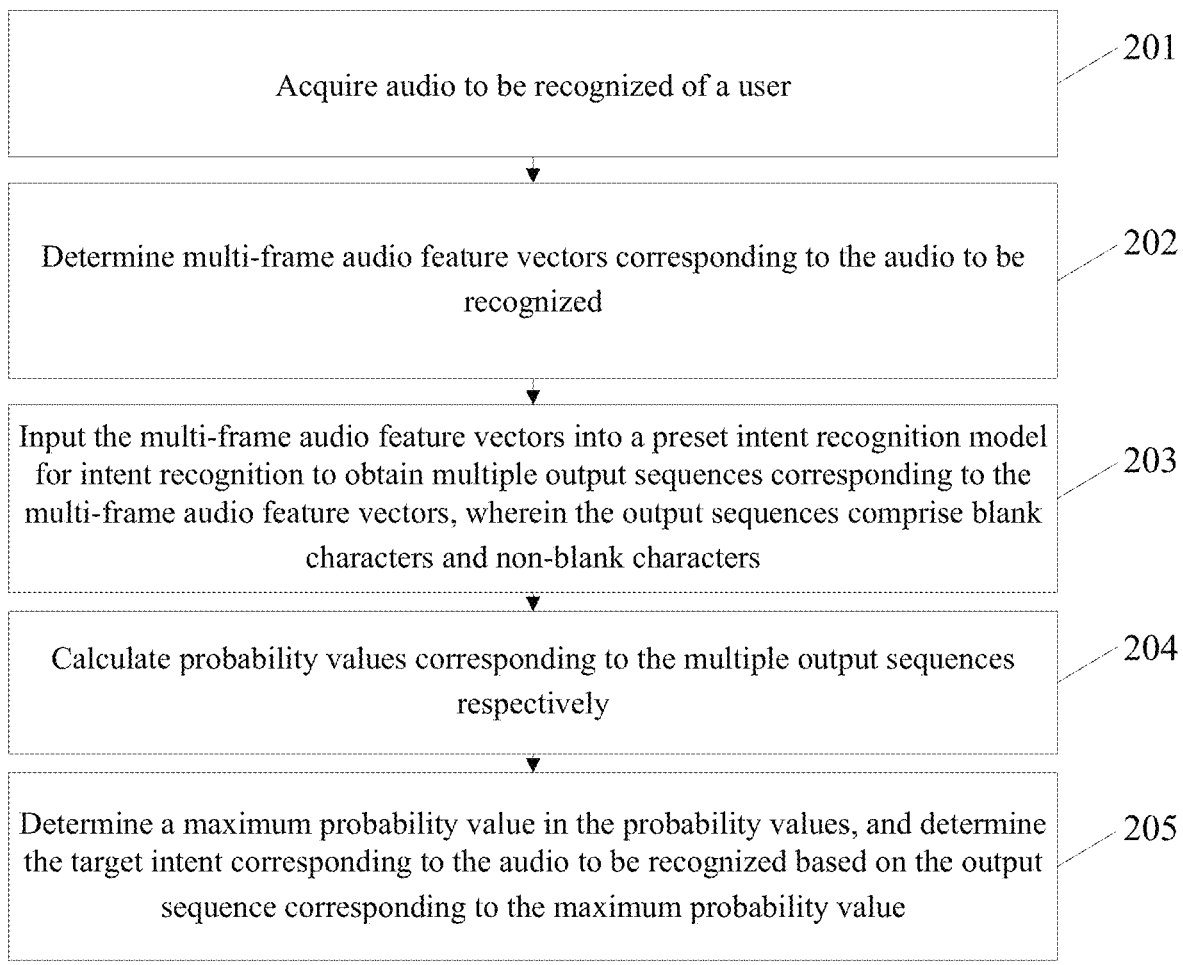
FIG. 2 is a flowchart illustrating an intent recognition method according to another embodiment of the present disclosure.

Further, to better explain the above intent recognition process, as a refinement and extension of the above embodiment, an intent recognition method is provided according to another embodiment of the present disclosure. As shown in FIG. 2, the method includes steps 201 to 205.

In 201, user's audio to be recognized is acquired.

Specifically, in the process of a user communicating with an AI customer service, the audio of the user, namely the audio to be recognized, is obtained in real time. The audio feature vectors corresponding to the audio to be recognized are determined. The audio feature vectors are analyzed by using a preset intent recognition model to determine the intent. On the basis, to improve the recognition accuracy of the preset intent recognition model, the preset intent recognition model needs to be trained and formulated firstly. In view of this, the method includes: formulating a preset initial intent recognition model and acquiring a sample audio and an actual output sequence corresponding to the sample audio; determining multi-frame sample audio feature vectors corresponding to the sample audio; inputting the multi-frame sample audio feature vectors into the preset initial intent recognition model to obtain a predicted output sequence corresponding to the multi-frame sample audio feature vectors; formulating a loss function corresponding to the preset initial intent recognition model based on the predicted output sequence and the actual output sequence; and formulating the preset intent recognition model based on the loss function.

Specifically, a plurality of preset initial intent recognition models is formulated, the model structures of the preset initial intent recognition models may be the same or different. Then the sample audio (which may be obtained in the conversation process of a historical user with an AI customer service) is obtained. An actual output sequence corresponding to the sample audio is determined. Multi-frame sample audio feature vectors corresponding to the sample audio are determined. A mapping relationship is established between the sample audio and the actual output sequence to obtain a sample set. The sample set is divided into a training set and a testing set. The training set is divided into a plurality of sub-training sets, wherein different sub-training sets correspond to different preset initial intent recognition models. Specifically, in the training process, the multi-frame sample audio feature vectors corresponding to the sample audio in the sub-training sets are input into the corresponding preset initial intent recognition model to obtain a predicted output sequence. The predicted output sequence is compared with the actual output sequence. The loss function corresponding to the preset initial intent recognition model is formulated according to the comparison result. The preset initial intent recognition model is trained according to the loss function, so that each preset initial intent recognition model can be trained. After the training is finished, each trained preset initial intent recognition model is tested by using the testing set to determine the prediction accuracy corresponding to each preset initial intent recognition model. Finally, the preset initial intent recognition model with the highest prediction accuracy is selected as the preset intent recognition model in the embodiment of the present disclosure. Therefore, the accuracy of intent recognition can be improved by training and formulating the preset intent recognition model.

In 202, multi-frame audio feature vectors corresponding to the audio to be recognized are determined.

In the embodiment of the present disclosure, to further improve the recognition accuracy of the preset intent recognition model, firstly, the multi-frame audio feature vectors corresponding to the audio to be recognized needs to be determined. In view of this, step 202 specifically includes: cutting the audio to be recognized in a preset length threshold unit to obtain a plurality of short-time frame audios; windowing the short-time frame audios by using a preset Hamming Window function to obtain a plurality of windowed audios corresponding to the short-time frame audios respectively; performing first-order high-pass filtering on the plurality of windowed audios to obtain a plurality of high-frequency short-time frame audios; performing transformation on the plurality of high-frequency short-time frame audios by utilizing a preset Fourier transform function respectively to obtain a plurality of processed high-frequency short-time frame audios; determining power spectrums corresponding to the processed high-frequency short-time frame audios respectively; performing convolution operation between the power spectrums and a preset triangular filtering function group to obtain a result filtered by triangular filtering functions in the preset triangular filtering function group; performing logarithmic operation on the result filtered by the triangular filtering functions to obtain high-dimensional audio features corresponding to the plurality of short-time frame audios respectively; and performing discrete cosine transform on the high-dimensional audio features corresponding to the plurality of short-time frame audios respectively to obtain the multi-frame audio feature vectors corresponding to the audio to be recognized.

Wherein, the preset length threshold is set according to actual requirements. Specifically, before performing audio feature extraction, preprocessing needs to be performed on the audio to be recognized. The purpose of the preprocessing is to remove noise, normalize signal strength, and the like. Common preprocessing methods include speech signal framing, windowing, pre-emphasis, and the like. The speech signal of the audio to be recognized is usually continuous. For the convenience of subsequent processing, the audio to be recognized needs to be framed. The purpose of framing is to cut the continuous speech signal into a plurality of short-time frames to obtain a plurality of short-time frame audios. For example, each frame may have a length of 20 ms-40 ms. The frames may be slid by using a window with a fixed size. There is usually an overlap between adjacent frames. Furthermore, to avoid abrupt change at the frame boundary, a Hamming Window function needs to be preset to perform windowing on the short-time frame audios to obtain a plurality of windowed audios corresponding to the short-time frame audios respectively. After windowing, each frame of audio is smooth in time. Further, because the high-frequency components tend to be seriously attenuated in the transmission process of the audio, on the basis, to compensate for the influence caused by the high-frequency attenuation, pre-emphasis processing needs to be performed on the plurality of windowed audios. The pre-emphasis processing aims to enhance the high-frequency components by performing first-order high-pass filtering on the plurality of windowed audios to obtain high-frequency short-time frame audios. Further, after framing, windowing and pre-emphasis, the short-time frame audios are converted into discrete signals in a time domain. The discrete signals need to be converted into signals in a frequency domain, on the basis, a preset Fourier transform function needs to be used for respectively performing transform processing on the high-frequency short-time frame audios to obtain a plurality of processed high-frequency short-time frame audios. The time domain signals are converted into frequency domain signals through the preset Fourier transform function. Further, power spectrums corresponding to the processed high-frequency short-time frame audios respectively are calculated. The calculated power spectrums may reflect the intensity of each frequency component. Further, convolution operation is performed between the power spectrums and a preset triangular filtering function group to obtain a result filtered by triangular filtering functions in the preset triangular filtering function group. Logarithmic operation is performed on the result filtered by the triangular filtering functions to obtain high-dimensional audio features corresponding to the plurality of short-time frame audios respectively. Discrete cosine transform is performed on the high-dimensional audio features corresponding to the plurality of short-time frame audios respectively to obtain the multi-frame audio feature vectors corresponding to the audio to be recognized.

In 203, the multi-frame audio feature vectors are input into a preset intent recognition model to obtain multiple output sequences corresponding to the multi-frame audio feature vectors, wherein the output sequences include blank characters and non-blank characters.

In the embodiment of the present disclosure, after the multi-frame audio feature vectors corresponding to the audio to be recognized are determined, the multi-frame audio feature vectors need to be input into a preset intent recognition model, to determine the intent corresponding to the audio to be recognized. In view of this, step 203 specifically includes: inputting the multi-frame audio feature vectors into the preset intent recognition model to obtain multiple output characters corresponding to the multi-frame audio feature vectors respectively; and splicing an arbitrary output character corresponding to the multi-frame audio feature vectors sequentially to obtain one of the output sequences corresponding to the multi-frame audio feature vectors.

Specifically, each frame audio feature vector is input into a preset intent recognition model and has multiple output results. If the audio feature vector is not output, a preset character "-" is used for representing the output result. Take the four-frame audio feature vectors as an example, the first frame audio feature vector is input into the preset intent recognition model. One of the output results corresponding to the first frame audio feature vector may be output as "-" through the preset intent recognition model. The second frame audio feature vector is input into the preset intent recognition model. One of the output results corresponding to the second frame audio feature vector may be output as "school" through the preset intent recognition model. The third frame audio feature vector is input into the preset intent recognition model. One of the output results corresponding to the third frame audio feature vector may be output as "school" through the preset intent recognition model. The fourth frame audio feature vector is input into the preset intent recognition model. One of the output results corresponding to the fourth frame audio feature vector may be output as "student" through the preset intent recognition model. The output results of the four frames audio feature vectors are combined sequentially to obtain a combined output sequence as "- school school student". Wherein, "-" represents a blank character, and "school" and "student" represent non-blank characters. Since each frame audio feature vector has multiple output results, multiple output sequences may be obtained finally. For example, if there are 20-frame audio feature vectors, the final output sequence may be: "- - - - I I I - am am - a - middle - school - student -" and "- - - I I I - am - a - middle - - school - - student - -".

In 204, probability values corresponding to the multiple output sequences respectively are calculated.

In the embodiment of the present disclosure, after the multiple output sequences are determined, it is necessary to calculate probability values corresponding to the multiple output sequences, to determine the optimal output sequence among the multiple output sequences. In view of this, step 204 specifically includes: removing the blank characters of an arbitrary output sequence in the multiple output sequences to obtain a processed output sequence; merging the duplicate non-blank characters in the processed output sequence to obtain a simplified output sequence; tokenizing the simplified output sequence to obtain multiple tokens corresponding to the arbitrary output sequence; determining token frequencies of the tokens in the arbitrary output sequence; and multiplying the token frequencies corresponding to the tokens to obtain a probability value corresponding to the arbitrary output sequence, wherein the determining token frequencies of the tokens in the arbitrary output sequence includes: determining total character count of the characters corresponding to the arbitrary output sequence, wherein the characters include blank characters and non-blank characters; determining quantity of the blank characters that are adjacent in forward order to an arbitrary token in the tokens, and determining quantity of the duplicate characters that are the same as the arbitrary token; dividing the quantity of the blank characters by the total quantity of the characters to obtain a blank token frequency corresponding to the arbitrary token; dividing a sum of the quantity of the duplicate character and 1 by the total quantity of the characters to obtain a duplicate token frequency corresponding to the arbitrary token; and multiplying the blank token frequency by the duplicate token frequency to obtain the token frequency of the arbitrary token in the arbitrary output sequence.

Specifically, for example, if the arbitrary output sequence is "- - - - I I I - am am - a - middle - school - student -", the simplified output sequence of "I a middle school student" is obtained by a strategy of merging consecutive identical characters and removing blank characters. The simplified output sequence is then tokenized, and the tokens of this arbitrary output sequence are: "I am a middle school student". The final formula for calculating the probability values of this arbitrary output sequence is: $P(i)=P(I) \times P(am) \times P(a) \times P(middle) \times P(school) \times P(student)$, where $P(i)$ represents a probability value of an arbitrary output sequence, $P(I)$ represents a token frequency of the token "I" in the arbitrary output sequence, $P(am)$ represents a token frequency of the token "am" in the arbitrary output sequence, $P(a)$ represents a token frequency of the token "a" in the arbitrary output sequence, and so on. Wherein i ranges from 1 to a maximum value N of all sequences, N represents a total number of output sequences. For example, the $P(I)$ is calculated as follows. Firstly, a partial sequence corresponding to the token "I" is found in the output sequence as follows: "- - - - III"; the number of blank characters "-" 4 is divide by the total number of characters in the output sequence 20 to get 0.2, which represents the blank token frequency corresponding to the token "I". Meanwhile, the number of the duplicate character which is the same as the token "I" in the partial sequence is 2, the result 3 of adding 2 and 1 is obtained. The result 3 is divided by the total quantity of the characters 20 to get 0.15, which represents the duplicate token frequency of the token "I". The blank token frequency is multiplied by the duplicate token frequency to obtain the token frequency of the token "I" in the arbitrary output sequence. Similarly, the $P(am)$ represents the product of the probability of "- am am". Therefore, the token frequency corresponding to each token can be calculated. The token frequencies corresponding to the tokens are multiplied to obtain the probability value corresponding to the arbitrary output sequence.

In 205, a maximum probability value in the probability values is determined, and then the target intent corresponding to the audio to be recognized is determined based on the output sequence corresponding to the maximum probability value.

In the embodiment of the present disclosure, after the probability values corresponding to the multiple output sequences are determined, a maximum probability value in the probability values is determined, and then the target intent corresponding to the audio to be recognized needs to be determined based on the output sequence corresponding to the maximum probability value. In view of this, step 205 specifically includes: combining the tokens of the output sequence corresponding to the maximum probability value in sequence to obtain the target intent corresponding to the audio to be recognized.

Specifically, as known from above step 204, if the output sequence corresponding to the maximum probability value is "I I I - am - a - middle - - school - - student - - - -", the tokens corresponding to this arbitrary output sequence are "I am a middle school student". The above tokens are combined in sequence to obtain a final target intent corresponding to the audio to be recognized: "I am a middle school student".

An intent recognition is provided according to another embodiment of the present disclosure. In the present disclosure, the user's audio to be recognized is acquired, in comparison with the present mode that the speaking content of a client is generally recognized, the speaking content is transcribed into a corresponding text, and then the intent of a speaker is recognized in the transcribed text. The multi-frame audio feature vectors corresponding to the audio to be recognized are determined. The multi-frame audio feature vectors are input into a preset intent recognition model to obtain multiple output sequences corresponding to the multi-frame audio feature vectors, wherein the output sequences include blank characters and non-blank characters. The target intent corresponding to the audio to be recognized is determined based on the multiple output sequences. Therefore, the final intent recognition result is obtained by directly extracting the audio features of the audio to be recognized and directly inputting the audio features into the model. By directly utilizing the model to recognize the audio features, conversion errors and time wasted in conversion caused by converting audio to text can be avoided, so that the present disclosure is able to improve the accuracy and the efficiency of the intent recognition.

Figure 3:
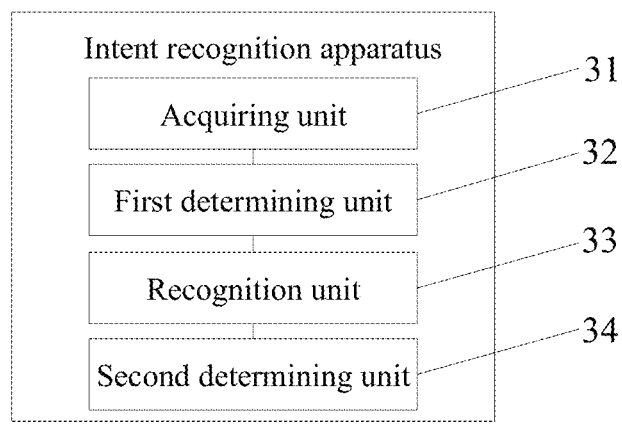
FIG. 3 is a schematic structural diagram illustrating an intent recognition apparatus according to an embodiment of the present disclosure.

Further, as a specific implementation of FIG. 1, an intent recognition apparatus is provided according to an embodiment of the present disclosure. As shown in FIG. 3, the apparatus includes: an acquiring unit 31, a first determining unit 32, a recognition unit 33 and a second determining unit 34.

The acquiring unit 31 may be configured to acquire user's audio to be recognized.

The first determining unit 32 may be configured to determine multi-frame audio feature vectors corresponding to the audio to be recognized.

The recognition unit 33 may be configured to input the multi-frame audio feature vectors into a preset intent recognition model to obtain multiple output sequences corresponding to the multi-frame audio feature vectors, wherein the output sequences include blank characters and non-blank characters.

The second determining unit 34 may be configured to determine a target intent corresponding to the audio to be recognized based on the multiple output sequences.

Figure 4:
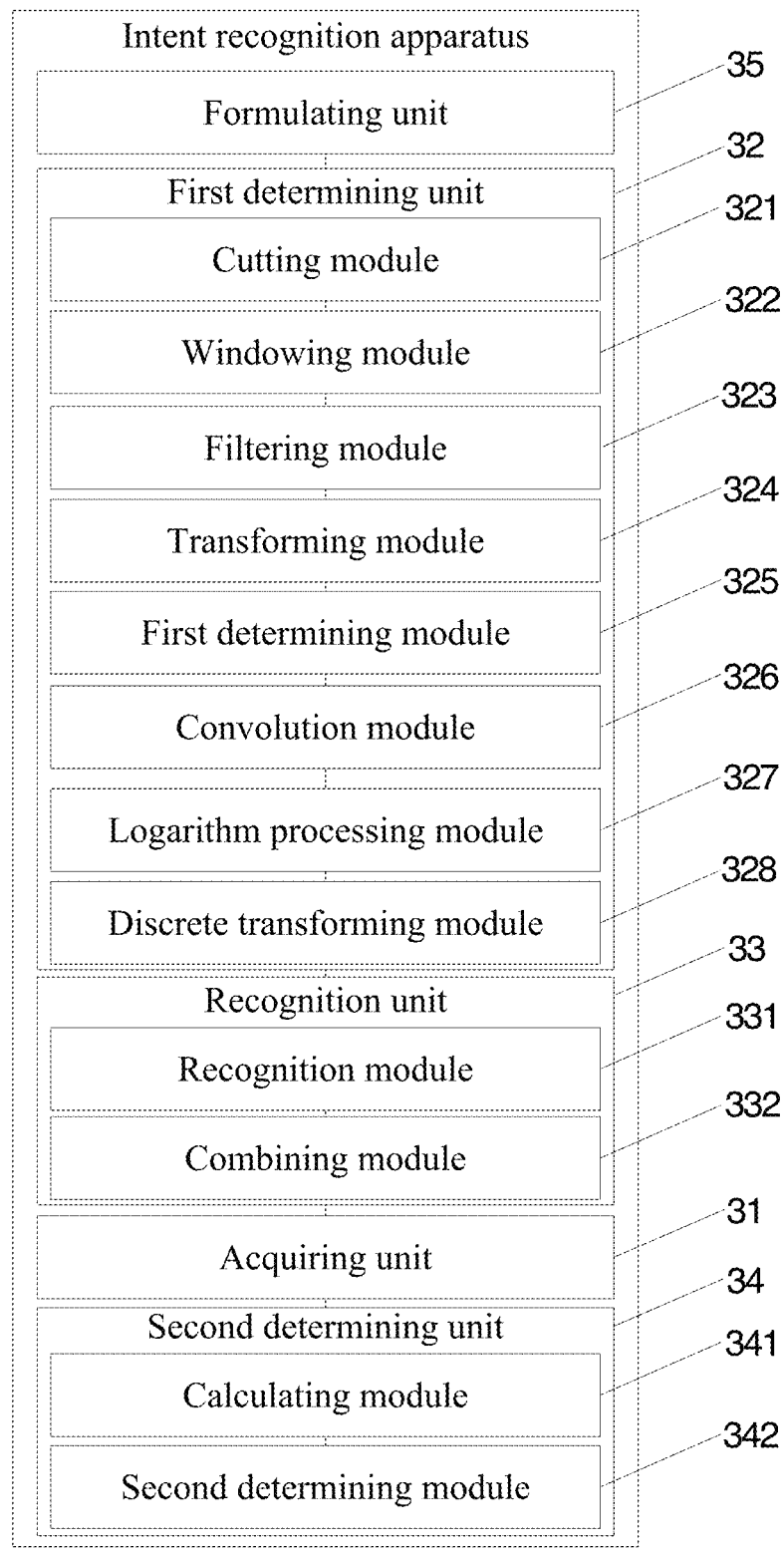
FIG. 4 is a schematic structural diagram illustrating an intent recognition apparatus according to another embodiment of the present disclosure.

In a specific application scenario, to formulate the preset intent recognition model, as shown in FIG. 4, the apparatus further includes a formulating unit 35.

The formulating unit 35 may be configured to formulate a preset initial intent recognition model, and acquire a sample audio and an actual output sequence corresponding to the sample audio.

The first determining unit 32 may be further configured to determine multi-frame sample audio feature vectors corresponding to the sample audio.

The recognition unit 33 may be further configured to input the multi-frame sample audio feature vectors into the preset initial intent recognition model to obtain a predicted output sequence corresponding to the multi-frame sample audio feature vectors.

The formulating unit 35 may be specifically configured to formulate a loss function corresponding to the preset initial intent recognition model based on the predicted output sequence and the actual output sequence.

The formulating unit 35 may be specifically configured to formulate the preset intent recognition model based on the loss function.

In a specific application scenario, to determine the multi-frame audio feature vectors corresponding to the audio to be recognized, the first determining unit 32 includes a cutting module 321, a windowing module 322, a filtering module 323, a transforming module 324, a first determining module 325, a convolution module 326, a logarithm processing module 327, and a discrete transforming module 328.

The cutting module 321 may be configured to cut the audio to be recognized in a preset length threshold unit to obtain a plurality of short-time frame audios.

The windowing module 322 may be configured to window the short-time frame audios by using a preset Hamming Window function to obtain a plurality of windowed audios corresponding to the short-time frame audios respectively.

The filtering module 323 may be configured to perform first-order high-pass filtering on the plurality of windowed audios to obtain a plurality of high-frequency short-time frame audios.

The transforming module 324 may be configured to perform transformation on the plurality of high-frequency short-time frame audios by utilizing a preset Fourier transform function respectively to obtain a plurality of processed high-frequency short-time frame audios.

The first determining module 325 may be configured to determine power spectrums corresponding to the processed high-frequency short-time frame audios respectively.

The convolution module 326 may be configured to convolution operation between the power spectrums and a preset triangular filtering function group to obtain a result filtered by triangular filtering functions in the preset triangular filtering function group.

The logarithm processing module 327 may be configured to perform logarithmic operation on the result filtered by the triangular filtering functions to obtain high-dimensional audio features corresponding to the plurality of short-time frame audios respectively.

The discrete transforming module 328 may be configured to perform discrete cosine transform on the high-dimensional audio features corresponding to the plurality of short-time frame audios respectively to obtain the multi-frame audio feature vectors corresponding to the audio to be recognized.

In a specific application scenario, in order to determine the multiple output sequences corresponding to multi-frame audio feature vectors, the recognition unit 33 includes a recognition module 331 and a combining module 332.

The recognition module 331 may be configured to input the multi-frame audio feature vectors into the preset intent recognition model to obtain multiple output characters corresponding to the multi-frame audio feature vectors respectively.

The combining module 332 may be configured to splice an arbitrary output character corresponding to the multi-frame audio feature vectors sequentially to obtain one of the output sequences corresponding to the multi-frame audio feature vectors.

In a specific application scenario, to determine the target intent corresponding to the audio to be recognized, the second determining unit 34 includes a calculating module 341 and a second determining module 342.

The calculating module 341 may be configured to calculate probability values corresponding to the multiple output sequences respectively.

The second determining module 342 may be configured to determine a maximum probability value in the probability values and then determine the target intent corresponding to the audio to be recognized based on the output sequence corresponding to the maximum probability value.

In a specific application scenario, in order to calculate probability values corresponding to multiple output sequences, the calculating module 341 may be specifically configured to: remove the blank characters of an arbitrary output sequence in the multiple output sequences to obtain a processed output sequence; merge the duplicate non-blank characters in the processed output sequence to obtain a simplified output sequence; tokenize the simplified output sequence to obtain multiple tokens corresponding to the arbitrary output sequence; determine token frequencies of the tokens in the arbitrary output sequence; and multiply the token frequencies corresponding to the tokens to obtain a probability value corresponding to the arbitrary output sequence.

In a specific application scenario, to determine the target intent corresponding to the audio to be recognized, the second determining module 342 may be specifically configured to combine the tokens of the output sequence corresponding to the maximum probability value in sequence to obtain the target intent corresponding to the audio to be recognized.

In a specific application scenario, in order to determine token frequencies of the tokens in the arbitrary output sequence, the calculating module 341 may be specifically configured to: determine total character count of the characters corresponding to the arbitrary output sequence, wherein the characters include blank characters and non-blank characters; determine quantity of the blank characters that are adjacent in forward order to an arbitrary token in the tokens, and determine quantity of the duplicate characters that are the same as the arbitrary token; divide the quantity of the blank characters by the total quantity of the characters to obtain a blank token frequency corresponding to the arbitrary token; divide a sum of the quantity of the duplicate character and 1 by the total quantity of the characters to obtain a duplicate token frequency corresponding to the arbitrary token; and multiply the blank token frequency by the duplicate token frequency to obtain the token frequency of the arbitrary token in the arbitrary output sequence.

It should be noted that other corresponding descriptions of the functional modules related to the intent recognition apparatus provided in the embodiment of the present disclosure may refer to the corresponding description of the method shown in FIG. 1, and are not described herein again.

Based on the method shown in FIG. 1, correspondingly, a computer readable storage medium is provided according to an embodiment of the present disclosure. The computer readable storage medium stores a computer program. The computer program, when executed by a processor, implements the following steps: acquiring user's audio to be recognized; determining multi-frame audio feature vectors corresponding to the audio to be recognized; inputting the multi-frame audio feature vectors into a preset intent recognition model to obtain multiple output sequences corresponding to the multi-frame audio feature vectors, wherein the output sequences include blank characters and non-blank characters; and determining a target intent corresponding to the audio to be recognized based on the multiple output sequences.

Figure 5:
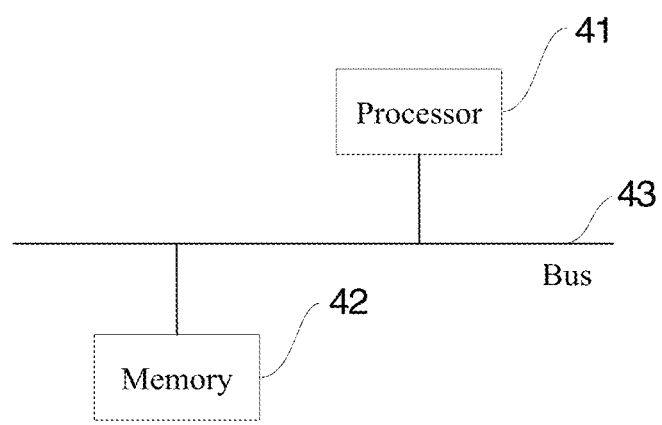
FIG. 5 is a schematic physical structure diagram illustrating a computer device according to an embodiment of the present disclosure.

Based on the above embodiments of the method shown in FIG. 1 and the apparatus shown in FIG. 3, a computer device is further provided according to an embodiment of the present disclosure. As shown in FIG. 5, the computer device includes: a processor 41, a memory 42, and a computer program that is stored in the memory 42 and executable by the processor, wherein the memory 42 and the processor 41 are each arranged on a bus 43. The computer program, when executed by the processor 41, implements the following steps: acquiring user's audio to be recognized; determining multi-frame audio feature vectors corresponding to the audio to be recognized; inputting the multi-frame audio feature vectors into a preset intent recognition model to obtain multiple output sequences corresponding to the multi-frame audio feature vectors, wherein the output sequences include blank characters and non-blank characters; and determining a target intent corresponding to the audio to be recognized based on the multiple output sequences.

According to the technical solutions of the present disclosure, the user's audio to be recognized is acquired. The multi-frame audio feature vectors corresponding to the audio to be recognized are determined. The multi-frame audio feature vectors are input into a preset intent recognition model to obtain multiple output sequences corresponding to the multi-frame audio feature vectors, wherein the output sequences include blank characters and non-blank characters. The target intent corresponding to the audio to be recognized is determined based on the multiple output sequences. Therefore, the final intent recognition result is obtained by directly extracting the audio features of the audio to be recognized and directly inputting the audio features into the model. By directly utilizing the model to recognize the audio features, conversion errors and time wasted in conversion caused by converting audio to text can be avoided, so that the present disclosure is able to improve the accuracy and the efficiency of the intent recognition.

Apparently, those skilled in the art should understand that the modules or steps in the present disclosure described above may be implemented by a general-purpose computing apparatus, which may be integrated on a single computing apparatus or distributed over a network including multiple computing apparatus. Alternatively, the modules or steps in the present disclosure may be implemented with program codes executable by a computing apparatus, such that the modules or steps in the present disclosure may be stored in a storage apparatus for execution by a computing apparatus. In some cases, the steps may be performed in a different order than that shown or described herein. Or the modules or steps in the present disclosure may be separately implemented by various integrated circuit modules, or multiple of the modules or steps are implemented in a single integrated circuit module. Thus, the present disclosure is not limited to any specific combination of hardware and software.

The above descriptions are only preferred examples of the present invention, and are not intended to limit the present invention. For those skilled in the art, the present invention may have various modifications and changes. Any modification, equivalent substitution and improvement made within the spirit and principle of the present application are deemed to fall into the protection scope of claims of the present disclosure.

What is claimed is:

1. An intent recognition method, comprising:
acquiring user's audio to be recognized;
determining multi-frame audio feature vectors corresponding to the audio to be recognized;

inputting the multi-frame audio feature vectors into a preset intent recognition model to obtain multiple output sequences corresponding to the multi-frame audio feature vectors, wherein the output sequences comprise blank characters and non-blank characters; and determining a target intent corresponding to the audio to be recognized based on the multiple output sequences;

wherein the determining the target intent corresponding to the audio to be recognized based on the multiple output sequences comprises:

calculating probability values corresponding to the multiple output sequences respectively; and determining a maximum probability value in the probability values, and then determining the target intent corresponding to the audio to be recognized based on the output sequence corresponding to the maximum probability value;

wherein the calculating probability values corresponding to the multiple output sequences respectively comprises:

removing the blank characters of an arbitrary output sequence in the multiple output sequences to obtain a processed output sequence;

merging a duplicate non-blank characters in the processed output sequence to obtain a simplified output sequence;

tokenizing the simplified output sequence to obtain multiple tokens corresponding to the arbitrary output sequence;

determining token frequencies of the tokens in the arbitrary output sequence; and multiplying the token frequencies corresponding to the tokens to obtain a probability value corresponding to the arbitrary output sequence;

wherein the determining the target intent corresponding to the audio to be recognized based on the output sequence corresponding to the maximum probability value comprises:

splicing the tokens of the output sequence corresponding to the maximum probability value in sequence to obtain the target intent corresponding to the audio to be recognized; and wherein the determining token frequencies of the tokens in the arbitrary output sequence comprises:

determining total quantity of a characters corresponding to the arbitrary output sequence, wherein the characters comprise blank characters and non-blank characters;

determining quantity of the blank characters that are adjacent in forward order to an arbitrary token in the tokens, and determining quantity of a duplicate characters that are the same as the arbitrary token;

dividing the quantity of the blank characters by the total quantity of the characters to obtain a blank token frequency corresponding to the arbitrary token;

dividing a sum of the quantity of the duplicate character and 1 by the total quantity of the characters to obtain a duplicate token frequency corresponding to the arbitrary token; and multiplying the blank token frequency by the duplicate token frequency to obtain the token frequency of the arbitrary token in the arbitrary output sequence.

2. The method according to claim 1, wherein before the acquiring user's audio to be recognized, the method further comprises:

formulating a preset initial intent recognition model and acquiring a sample audio and an actual output sequence corresponding to the sample audio;

determining multi-frame sample audio feature vectors corresponding to the sample audio;

inputting the multi-frame sample audio feature vectors into the preset initial intent recognition model to obtain a predicted output sequence corresponding to the multi-frame sample audio feature vectors;

formulating a loss function corresponding to the preset initial intent recognition model based on the predicted output sequence and the actual output sequence; and formulating the preset intent recognition model based on the loss function.

3. The method according to claim 1, wherein the determining multi-frame audio feature vectors corresponding to the audio to be recognized comprises:

cutting the audio to be recognized in a preset length threshold unit to obtain a plurality of short-time frame audios;

windowing the short-time frame audios by using a preset Hamming Window function to obtain a plurality of windowed audios corresponding to the short-time frame audios respectively;

performing first-order high-pass filtering on the plurality of windowed audios to obtain a plurality of high-frequency short-time frame audios;

performing transformation on the plurality of high-frequency short-time frame audios by utilizing a preset Fourier transform function respectively to obtain a plurality of processed high-frequency short-time frame audios;

determining power spectrums corresponding to the processed high-frequency short-time frame audios respectively;

performing convolution operation between the power spectrums and a preset triangular filtering function group to obtain a result filtered by triangular filtering functions in the preset triangular filtering function group;

performing logarithmic operation on the result filtered by the triangular filtering functions to obtain high-dimensional audio features corresponding to the plurality of short-time frame audios respectively; and performing discrete cosine transform on the high-dimensional audio features corresponding to the plurality of short-time frame audios respectively to obtain the multi-frame audio feature vectors corresponding to the audio to be recognized.

4. The method according to claim 1, wherein the inputting the multi-frame audio feature vectors into the preset intent recognition model to obtain multiple output sequences corresponding to the multi-frame audio feature vectors comprises: inputting the multi-frame audio feature vectors into the preset intent recognition model to obtain multiple output characters corresponding to the multi-frame audio feature vectors respectively; and splicing an arbitrary output character corresponding to the multi-frame audio feature vectors sequentially to obtain one of the output sequences corresponding to the multi-frame audio feature vectors.

5. An intent recognition apparatus, comprising:

an acquiring unit configured to acquire user's audio to be recognized;

a first determining unit configured to determine multi-frame audio feature vectors corresponding to the audio to be recognized;

a recognition unit configured to input the multi-frame audio feature vectors into a preset intent recognition model to obtain multiple output sequences corresponding to the multi-frame audio feature vectors, wherein the output sequences comprise blank characters and non-blank characters; and a second determining unit configured to determine a target intent corresponding to the audio to be recognized based on the multiple output sequences;

wherein the second determining unit is further configured to: calculate probability values corresponding to the multiple output sequences respectively; determine a maximum probability value in the probability values, and then determine the target intent corresponding to the audio to be recognized based on the output sequence corresponding to the maximum probability value;

wherein the calculating probability values corresponding to the multiple output sequences respectively comprises: removing the blank characters of an arbitrary output sequence in the multiple output sequences to obtain a processed output sequence;

merging a duplicate non-blank characters in the processed output sequence to obtain a simplified output sequence;

tokenizing the simplified output sequence to obtain multiple tokens corresponding to the arbitrary output sequence;

determining token frequencies of the tokens in the arbitrary output sequence; and multiplying the token frequencies corresponding to the tokens to obtain a probability value corresponding to the arbitrary output sequence;

wherein the determining the target intent corresponding to the audio to be recognized based on the output sequence corresponding to the maximum probability value comprises:

splicing the tokens of the output sequence corresponding to the maximum probability value in sequence to obtain the target intent corresponding to the audio to be recognized; and wherein the determining token frequencies of the tokens in the arbitrary output sequence comprises:

determining total quantity of the characters corresponding to the arbitrary output sequence, wherein the characters comprise blank characters and non-blank characters;

determining quantity of the blank characters that are adjacent in forward order to an arbitrary token in the tokens, and determining quantity of a duplicate characters that are the same as the arbitrary token;

dividing the quantity of the blank characters by the total quantity of the characters to obtain a blank token frequency corresponding to the arbitrary token;

dividing a sum of the quantity of the duplicate character and 1 by the total quantity of the characters to obtain a duplicate token frequency corresponding to the arbitrary token; and multiplying the blank token frequency by the duplicate token frequency to obtain the token frequency of the arbitrary token in the arbitrary output sequence.

6. A non-transitory computer readable storage medium storing a computer program, wherein the computer program, when executed by a processor, performs steps of the method according to claim 1.

* * * * *